(12) United States Patent  (10) Patent No.: US 8,646,477 B2
Wen  (45) Date of Patent: Feb. 11, 2014

(54) STRUCTURE OF VALVE STEM AND FRAME LINING

(76) Inventor: Yuan-Hung Wen, Hemei Town (TW)

( * ) Notice: Subject to any disclaimer, the term of this patent is extended or adjusted under 35 U.S.C. 154(b) by 48 days.

(21) Appl. No.: 13/459,054

(22) Filed: Apr. 27, 2012

(65) Prior Publication Data

US 2013/0284964 A1 Oct. 31, 2013

(51) Int. Cl.
F16K 15/20 (2006.01)
(52) U.S. Cl.
USPC ............ 137/223; 137/233; 251/273; 152/427
(58) Field of Classification Search
USPC .......... 152/415, 427, 429; 137/223, 226, 232, 137/233; 251/216, 267, 273, 274
See application file for complete search history.

(56) References Cited

U.S. PATENT DOCUMENTS

| | | | | |
|---|---|---|---|---|
| 501,715 A * | 7/1893 | Hardwick | ...................... | 285/200 |
| 616,750 A * | 12/1898 | Tribuzio | ...................... | 137/234 |
| 875,542 A * | 12/1907 | Lurtey | ........................... | 152/429 |
| 1,212,641 A * | 1/1917 | Hilding | ......................... | 137/232 |
| 1,223,901 A * | 4/1917 | Payne | ........................... | 251/273 |
| 1,493,293 A * | 5/1924 | Timberlake | ................... | 137/223 |
| 2,018,584 A * | 10/1935 | Watson | ......................... | 152/427 |
| 2,103,822 A * | 12/1937 | Perry | ............................ | 137/223 |
| 2,864,617 A * | 12/1958 | Crowley et al. | ............... | 473/575 |
| 5,746,850 A * | 5/1998 | Luscher et al. | ............ | 152/339.1 |
| 8,122,927 B2 * | 2/2012 | Sinyard et al. | ................ | 152/429 |

* cited by examiner

*Primary Examiner* — John Rivell
*Assistant Examiner* — R. K. Arundale
(74) *Attorney, Agent, or Firm* — Banger Shia

(57) ABSTRACT

A structure of valve stem and frame lining includes a frame lining, a valve body, and a stem. At least two ribs are formed on one face of the frame lining, and the other opposite face of the frame lining is engaged with a base portion of the valve body by molding. The stem is disposed in an air channel of the valve body to control availability of air through the air channel. More particularly, when being disposed on a wheel frame, the frame lining has a width which enables the frame lining to overlap an outer cover engaged with the wheel frame to provide good sealing performance. Besides, the ribs help the frame lining be positioned on the wheel frame.

7 Claims, 6 Drawing Sheets

STRUCTURE OF VALVE STEM AND FRAME LINING

BACKGROUND OF THE INVENTION

1. Field of the Invention

The present invention relates to a structure of valve stem and frame lining.

2. Description of the Prior Art

Tires are inflated by filled with gas usually via valve stems disposed on wheel frames. Conventional valve stems are usually employed for tires with inner tubes, as disclosed in patents TW 510315, TW M289391, TW M414521, and TW M355175. Air rooms of tires with inner tubes are closed and have little problem of air-leakage. However, if the valve stems disclosed in the patents mentioned above are employed for tires without inner tube, air-leakage may easily happen.

Even though rubber enhancement pieces are formed on the bottom of valve stems in foregoing patents, the enhancement pieces can only be disposed on inner tubes or tubular tires. Valve stems of tires without inner tubes are disposed on wheel frames, so some through holes should be formed on wheel frames to receive valve stems. However, the wheel frames are made of hard materials, so that it is not convenient that the holes on the wheel frames possibly result air-leakage.

Besides, a valve stem for a tire without inner tube is disclosed in patent U.S. Pat. No. 6,119,746. However, the wheel frame should form two holes every valve stem, and only one O-ring is disposed between the each hole and the valve stem. Moreover, there is no anti-leakage measure between the outer cover and the wheel frame. Thus, air-leakage is highly possible to happen.

The present invention is, therefore, arisen to obviate or at least mitigate the above mentioned disadvantages.

SUMMARY OF THE INVENTION

The main object of the present invention is to provide a structure of valve stem and frame lining which provides good sealing performance. Also, it is light-weight, strengthened, and easier to manufacture.

To achieve the above and other objects, a structure of valve stem and frame lining of the present invention includes a frame lining, a valve body, and a stem.

The frame lining has a first face and an opposite second face. The first face extends and becomes an annular face along a longitudinal direction of the frame lining. At least two ribs are formed on the second face. Each rib extends along the longitudinal direction of the frame lining and has a predetermined distance from a center of a width of the second face. When the frame lining is disposed on a wheel frame, the ribs abut against corners of the wheel frame to position the frame lining on the wheel frame. Besides, the frame lining has a width which enables the frame lining to overlap the outer cover. Thus, engagement between the outer cover and the wheel frame is covered and sealed.

The valve body has a predetermined length and has a first end and an opposite second end. The valve body forms an air channel penetrating the valve body from the first end to the second end. The first end of the valve body is engaged with the first face of the frame lining by molding to provide better performance of sealing. Also, the first end of the valve body has a base portion which is embedded inside the annular face. On the other hand, an external diameter of the base portion is larger than that of other parts of the valve body, and the base portion is connected to parts of the valve body except the base portion with an arc face.

The stem has a predetermined length and is disposed in the air channel of the valve body to control availability of air through the air channel.

Thereby, the structure of valve stem and frame lining is able to prevent rubber material from chapping. Also, better performance of sealing and strength of structure are provided, and installation and manufacture are easier.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Please refer to FIG. 1 to FIG. 4. The structure of valve stem and frame lining of the present invention includes a frame lining 1, a valve body 2, and a stem 3.

Figure 5:
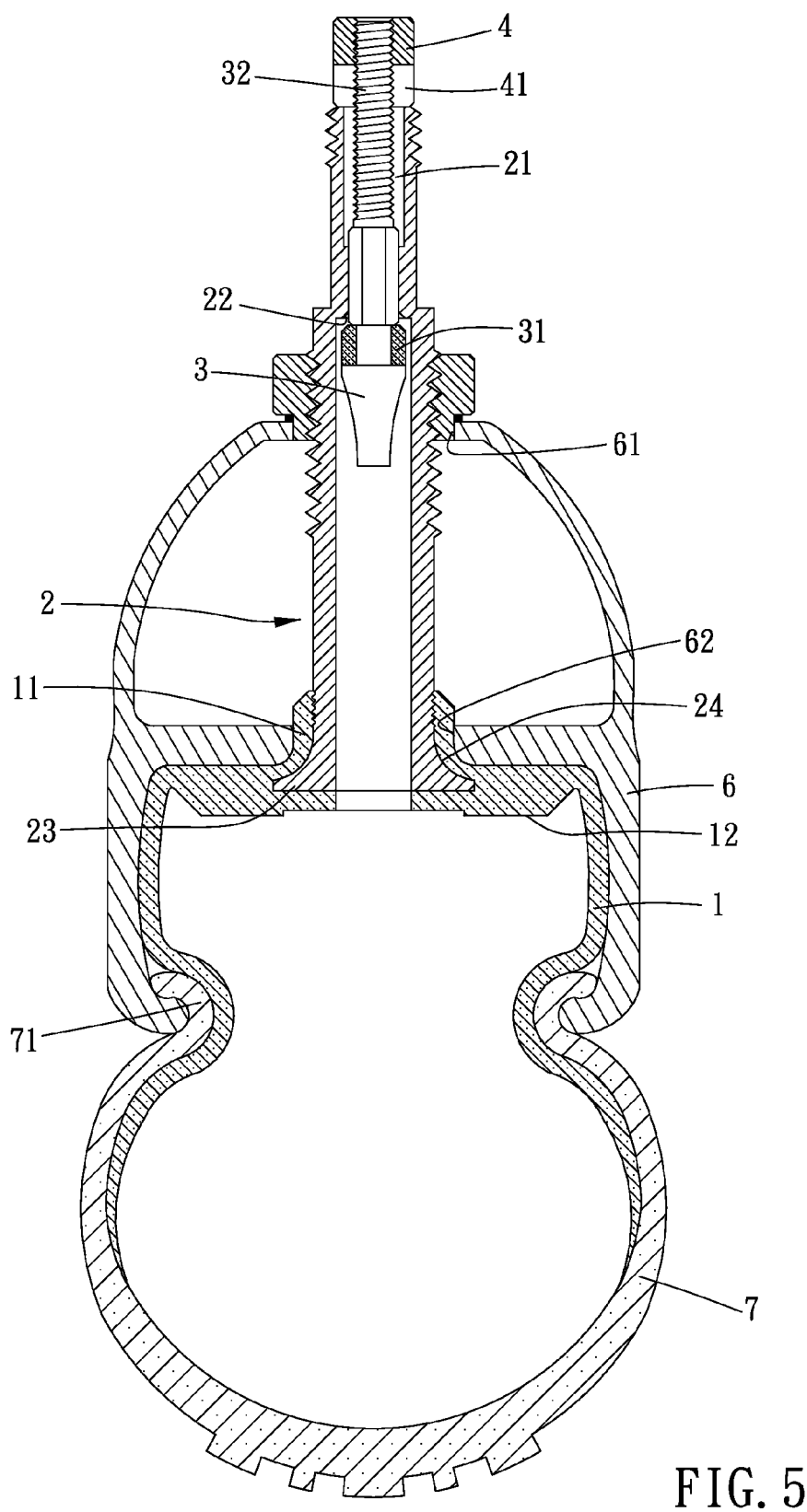
FIGS. 5 and 6 are illustrations showing a structure of valve stem and frame lining of the present invention.

The frame lining 1 is made of rubber and has a first face and an opposite second face. The first face extends along a longitudinal direction of the frame lining 1 and becomes an annular face. At least two ribs 12 are formed on the second face. Each rib 12 extends along the longitudinal direction of the frame lining 1 and has a predetermined distance from a center of a width of the second face. When the frame lining 1 is disposed on a wheel frame, the ribs 12 abuts against corners of the wheel frame to position the frame lining 1 on the wheel frame, as shown in FIG. 5. On the other hand, in a preferred embodiment, a thickness of each side of a width of the frame lining 1 is smaller than a thickness of other parts of the frame lining 1.

The valve body 2 in a predetermined length is formed integrally and has a first end and an opposite second end. An air channel 21 is formed in the valve body 2 and penetrates the valve body 2 from the first end to the second end. A base portion 23 at the first end of the valve body 2 is engaged with the first face of the frame lining 1 by molding. More specifically, when manufacturing, the air channel 21 doesn't communicate with exterior at the first end of the valve body 2. After engaged with the frame lining 1 by molding, the first end of the valve body 2 and a part of the frame lining 1 corresponding to the valve body 2 are opened through. Thus, raw edges and blockage by redundant material are prevented.

Figure 1:
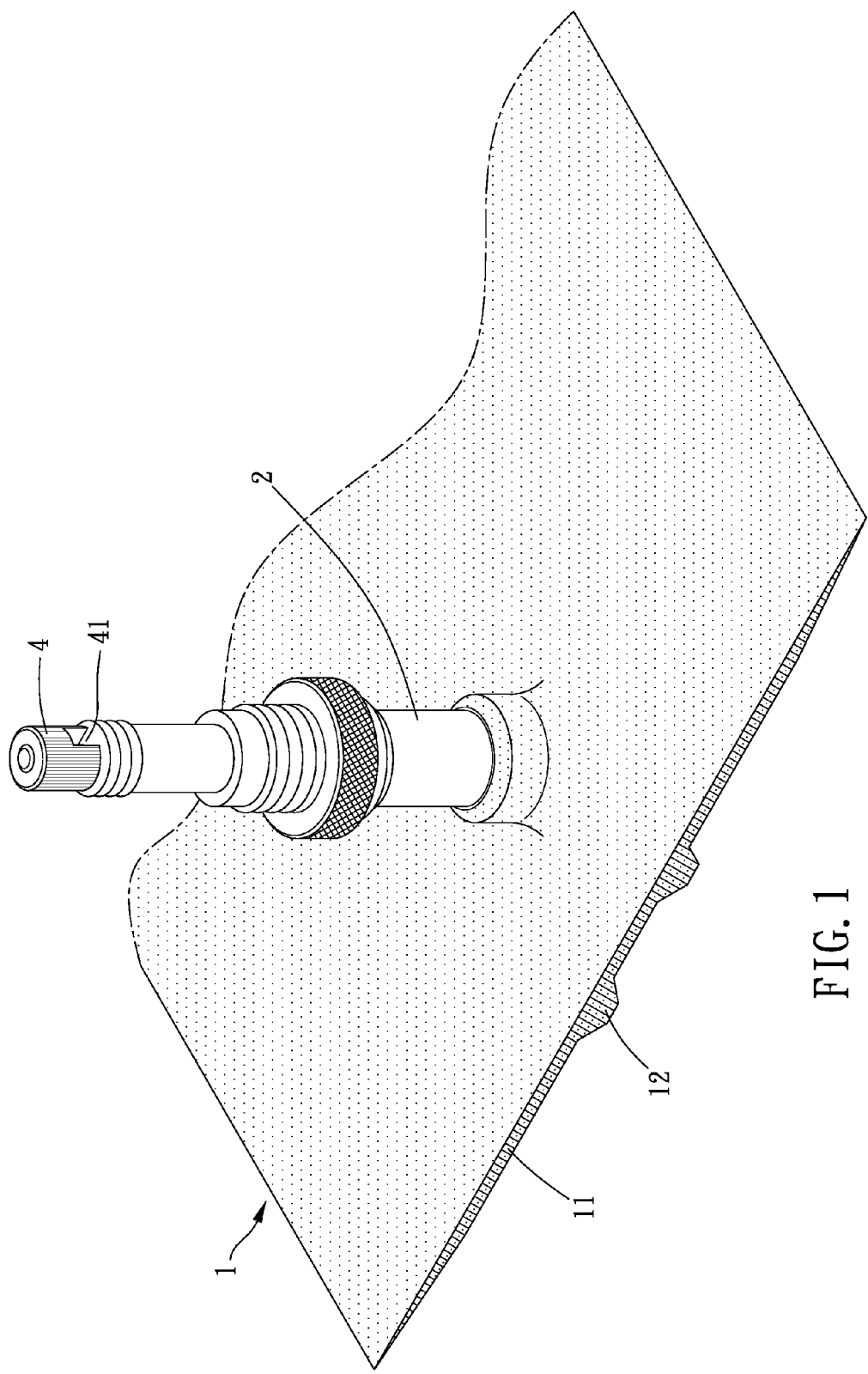
FIG. 1 is a stereogram showing a structure of valve stem and frame lining of the present invention.
Figure 2:
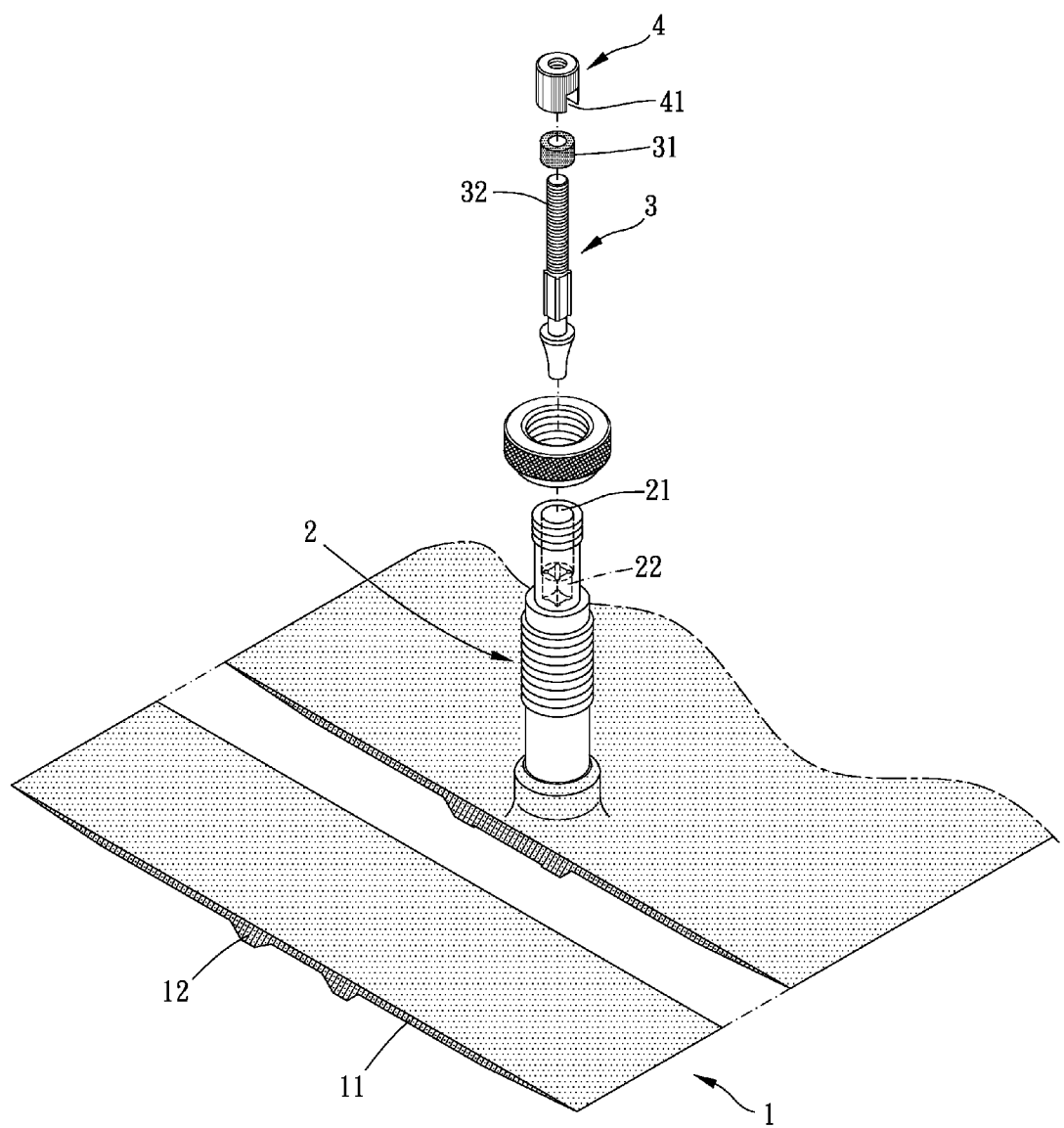
FIG. 2 is a breakdown drawing showing a structure of valve stem and frame lining of the present invention.
Figure 3:
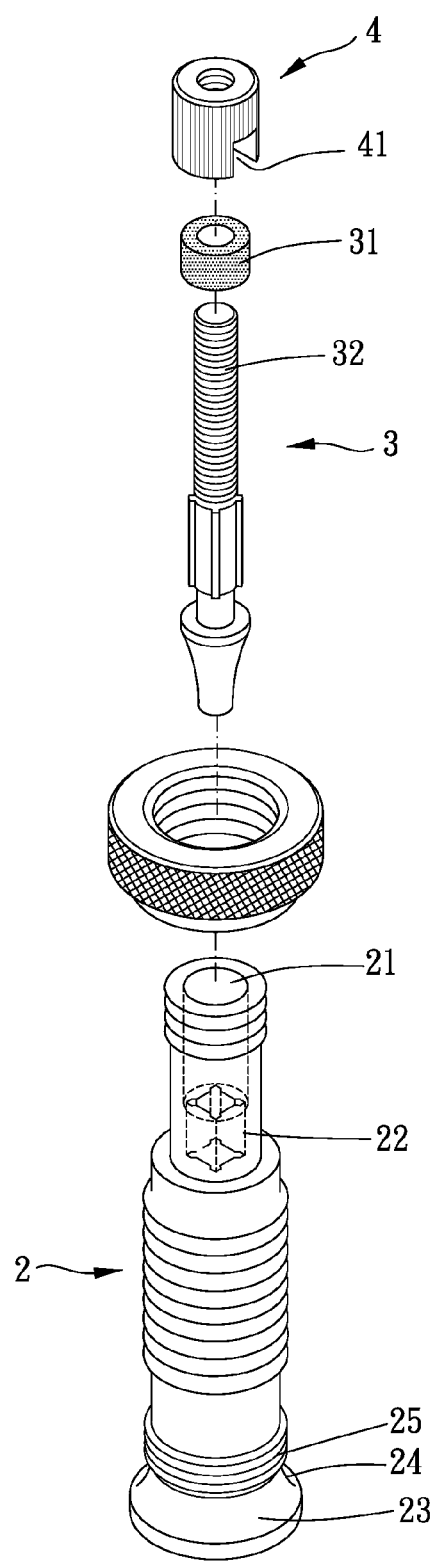
FIG. 3 is a partial breakdown drawing showing a structure of valve stem and frame lining of the present invention.
Figure 4:
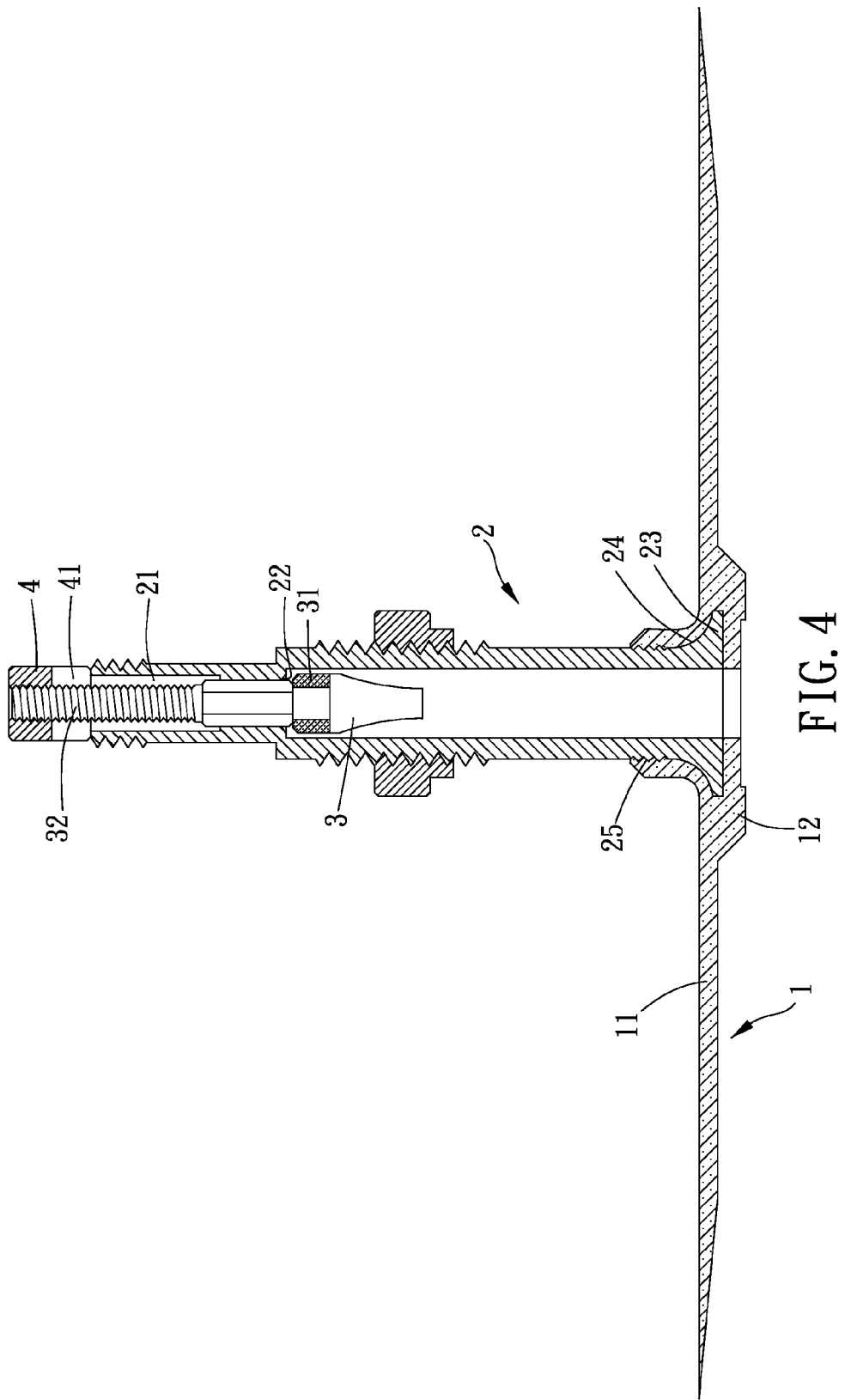
FIG. 4 is a profile showing a structure of valve stem and frame lining of the present invention.

An external diameter of the base portion 23 is larger than external diameters of parts of the valve body 2 except the base portion 23, and the base portion 23 is connected to parts of the valve body 2 except the base portion 23 with an arc face 24. The base portion 23 is embedded in the annular face and is not protruded outside of the annular face to provide firm engagement between the valve body 2 and the frame lining 1. Preferably, an area of the valve body 2 connects with the frame lining 1 forms external threads 25 to increase a contact area of the valve body 2 and the frame lining 1. Hence, engagement between the valve body 2 and the frame lining 1 is further strengthened. Besides, an area of the frame lining 1 corresponding to the base portion 23 has a thickness larger than that of other areas of the frame lining 1, as shown in FIG. 2. In addition, a shrinking portion with a smaller internal diameter is formed in the air channel 21.

The stem 3 has a predetermined length and has a third end and an opposite fourth end. The stem 3 is inserted in the air channel 21 and is able to control availability of air through the air channel 21. More specifically, the stem 3 has a sealing portion 31 located between the shrinking portion 22 and the first end of the valve body 2. The sealing portion 31 is made of rubber and is sleeved onto the stem 3, and an external diameter of the sealing portion 31 is larger than an internal diameter of the shrinking portion 22. The stem 3 has an extending rod 32 at the fourth end. The extending rod 32 forms external threads, and a limitation element 4 located outside of the second end of the valve body 2 forms internal threads to screw with the extending rod 32. When the limitation element 4 is rotated, the stem 3 moves along a longitudinal direction of the stem 3. The limitation element 4 further has at least one air entrance 41 communicating with a space enclosed by the internal threads of the limitation element 4.

Now please refer to FIG. 5, a wheel frame 6 has an inner peripheral wall and an outer peripheral wall. Each of the inner and the outer peripheral walls forms a through hole 61,62. The second end of the valve body 2 is inserted through the through hole 62 on the outer peripheral wall and the through hole 61 on the inner peripheral wall. The rubber material 11 of engagement between the base portion 23 and the frame lining 1 abuts against the through hole 62 to avoid air-leakage. Besides, each rib 12 of the frame lining 12 abuts against corners of the outer peripheral wall of the wheel frame 6, so that the frame lining 1 is able to be positioned to the wheel frame 6. On the other hand, when a convex ear 71 of an outer cover 7 connects with the wheel frame 6, the frame lining 1 is wide enough to partially overlap the outer cover 7, so that engagement between the convex ear 71 and the wheel frame 6 is covered and prevent air-leakage. Moreover, thinner edges of the frame lining 1 positionally correspond to central part of the outer cover 7 which has a larger thickness. Thus, weight of whole tire is decreased.

Figure 6:
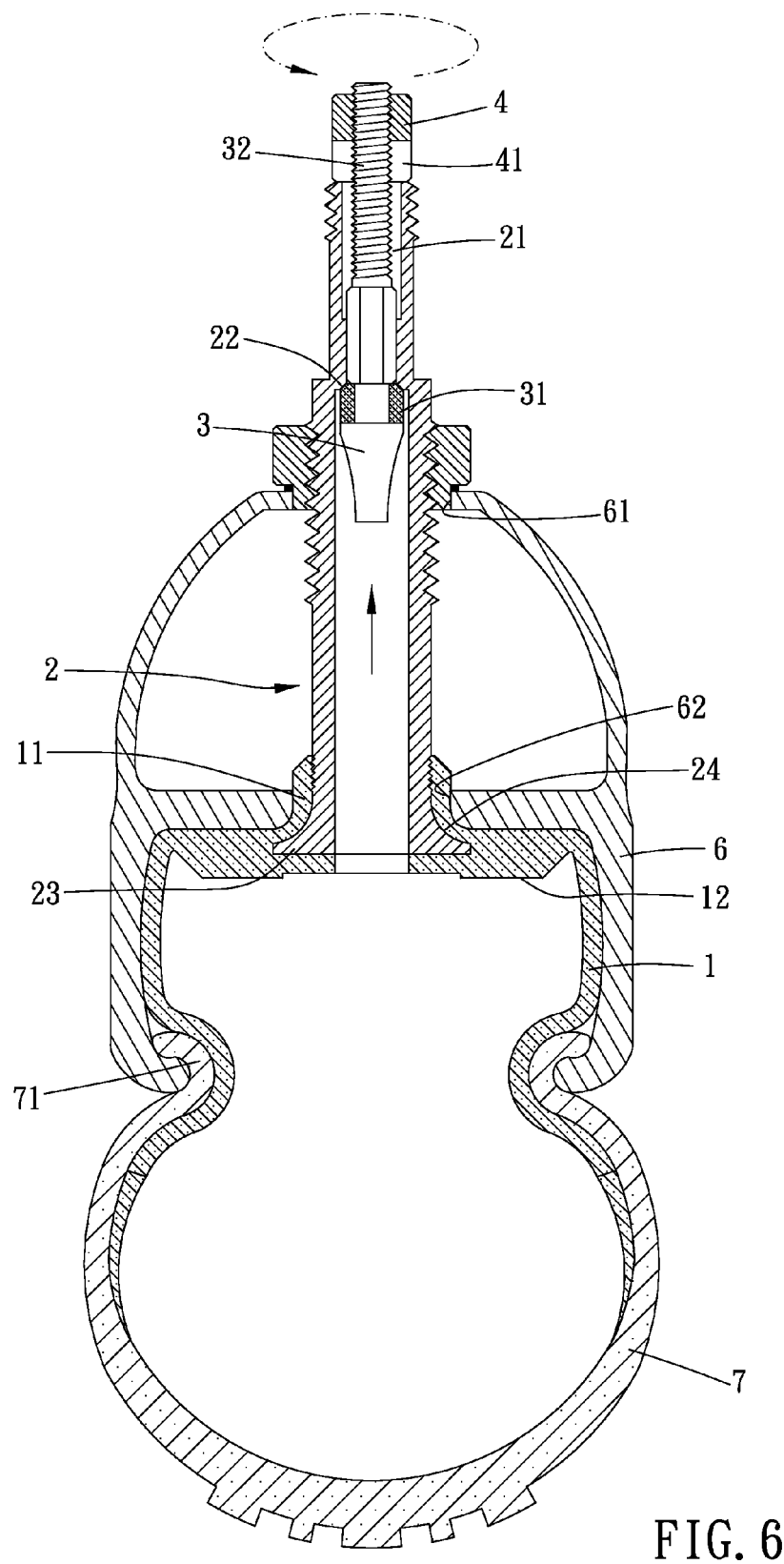

Please refer to FIG. 5 and FIG. 6 for practice. When the sealing portion 31 abuts against the shrinking portion 22 of the valve body 2, air is unable to reach the first end of the valve body 2 through the air channel 21 from the air entrance 41 to prevent gas in the tire from sealing, as shown in FIG. 6. When inflation of tire is needed, the limitation element 4 is rotated toward a specific direction to drive the stem 3 to move toward the first end of the valve body 2. And then, the sealing portion 31 doesn't abut against the shrinking portion 22 and is further away from the shrinking portion 22. Thus, air is able to reach the first end of the valve body 2 through the air channel 21 from the air entrance 41, so that a user can use an inflator to pump air into a tire through the valve stem, as shown in FIG. 5. When inflation is completed, a user can rotate the limitation element 4 toward an opposite direction to drive the stem 3 to move away from the first end of the valve body 2, so that the sealing portion 31 is able to abut against the shrinking portion 22 of the valve body 2 again.

The base portion of the valve body is completely embedded in the frame lining, and the base portion is connected with the arc face. Also, the area contacting the frame lining of the valve body has external threads. Thus, engagement between the valve body and the frame lining is quite strengthened. Besides, the valve body and the frame lining are engaged by molding, and the part of the frame lining corresponding to the base portion has a larger thickness. Hence, promoted strength of structure is provided.

In addition, the valve stem and the frame lining of the present invention prevent air-leakage and are light-weight. The ribs further help the frame lining be positioned. Also, manufacture is easier, and better products are provided.

What is claimed is:

1. A structure of valve stem and frame lining, including:
    a frame lining, having a first face and an opposite second face, the first face extending along a longitudinal direction of the frame lining and becoming an annular face, at least two ribs being formed on the second face of the frame lining, each rib extending along the longitudinal direction of the frame lining and having a predetermined distance from a center of a width of the second face, the ribs being able to abut against corners of a wheel frame to position the frame lining to the wheel frame;
    a valve body with a predetermined length, having a first end and an opposite second end, the valve body forming an air channel penetrating the valve body from the first end to the second end, the first end of the valve body being engaged with the first face of the frame lining by molding to provide good sealing and strength of structure, the first end of the valve body having a base portion which is embedded inside the annular face and is not protruded outside of the annular face to provide firm engagement between the valve body and the frame lining;
    a stem with a predetermined length, being disposed in the air channel to control availability of air through the air channel.

2. The structure of valve stem and frame lining of claim 1, wherein an area of the frame lining connected to the base portion has a thickness larger than that of other areas of the frame lining.

3. The structure of valve stem and frame lining of claim 1, wherein the frame lining has a width which enables the frame lining to overlap an outer cover engaged with a wheel frame, engagement between the outer cover and the wheel frame is covered by the frame lining.

4. The structure of valve stem and frame lining of claim 1, wherein a thickness of each side at a width of the frame lining is smaller than a thickness of other areas of the frame lining.

5. The structure of valve stem and frame lining of claim 1, wherein the valve body is formed integrally.

6. The structure of valve stem and frame lining of claim 1, wherein an external diameter of the base portion is larger than external diameters of other parts of the valve body, the base portion is connected to the parts of the valve body with an arc face.

7. The structure of valve stem and frame lining of claim 6, wherein an area of the valve body connecting with the frame lining forms external threads to increase a contact area of the valve body and the frame lining.

* * * * *